United States Patent
Vosz (10) Patent No.: US 8,789,358 B2
(45) Date of Patent: Jul. 29, 2014

(54) SELECTIVE CATALYTIC REDUCTION CATALYST AMMONIA STORAGE CONTROL SYSTEMS AND METHODS

(75) Inventor: Adam Vosz, Shelby Township, MI (US)

(73) Assignee: GM Global Technology Operations LLC

( * ) Notice: Subject to any disclaimer, the term of this patent is extended or adjusted under 35 U.S.C. 154(b) by 771 days.

(21) Appl. No.: 12/945,059

(22) Filed: Nov. 12, 2010

(65) Prior Publication Data

US 2012/0117951 A1 May 17, 2012

(51) Int. Cl.
*F01N 3/00* (2006.01)
*F01N 3/10* (2006.01)

(52) U.S. Cl.
USPC ............... 60/286; 60/274; 60/295; 60/301; 60/303

(58) Field of Classification Search
USPC ............... 60/274, 276, 286, 295, 301, 303
See application file for complete search history.

(56) References Cited

U.S. PATENT DOCUMENTS

| | | | |
|---|---|---|---|
| 6,981,368 B2 * | 1/2006 | van Nieuwstadt et al. | 60/277 |
| 7,991,533 B2 * | 8/2011 | Huang | 701/101 |
| 8,109,092 B2 * | 2/2012 | Pursifull et al. | 60/607 |

* cited by examiner

*Primary Examiner* — Thomas Denion
*Assistant Examiner* — Diem Tran (57) ABSTRACT

A control system for a vehicle includes a location identification module, an adjustment triggering module, and an adjustment module. The location identification module identifies a location where an engine of the vehicle is expected to be shut down and later re-started with at least one temperature within a predetermined range of an ambient temperature at the time of the re-start. The adjustment triggering module generates a triggering signal when a vehicle location provided by a global positioning system (GPS) is less than a predetermined distance from the identified location. The adjustment module selectively one of increases and decreases a rate at which a dosing agent is injected into an exhaust system, upstream of a selective catalytic reduction (SCR) catalyst, when the triggering signal is generated.

19 Claims, 4 Drawing Sheets

SELECTIVE CATALYTIC REDUCTION CATALYST AMMONIA STORAGE CONTROL SYSTEMS AND METHODS

FIELD

The present disclosure relates to internal combustion engines and more particularly to exhaust treatment systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture generates torque.

Exhaust resulting from the combustion of the air/fuel mixture is expelled from the cylinders to an exhaust system. The exhaust may include particulate matter (PM) and gas. The exhaust gas includes nitrogen oxides (NOx), such as nitrogen oxide (NO) and nitrogen dioxide ($NO_2$). A treatment system reduces NOx and oxidizes PM in the exhaust.

The exhaust flows from the engine to an oxidation catalyst (OC). The OC removes hydrocarbons and/or carbon oxides from the exhaust. The exhaust flows from the OC to a selective catalytic reduction (SCR) catalyst. A dosing agent injector injects a dosing agent into the exhaust stream, upstream of the SCR catalyst. Ammonia ($NH_3$) provided by the dosing agent is absorbed by the SCR catalyst. Ammonia reacts with NOx in the exhaust passing the SCR catalyst.

A dosing module controls the mass flow rate of dosing agent injected by the dosing agent injector. In this manner, the dosing module controls the supply of ammonia to the SCR catalyst and the amount of ammonia stored by the SCR catalyst. The amount of ammonia stored by the SCR catalyst is referred to as current storage (e.g., grams). The percentage of NOx input to the SCR catalyst that is removed from the exhaust is referred to as the NOx conversion efficiency. The NOx conversion efficiency is related to the current storage of the SCR catalyst. For example, the NOx conversion efficiency increases as the current storage of the SCR catalyst increases and vice versa. The dosing module may control the injection of dosing agent, for example, to maximize the NOx conversion efficiency.

SUMMARY

A control system for a vehicle includes a location identification module, an adjustment triggering module, and an adjustment module. The location identification module identifies a location where an engine of the vehicle is expected to be shut down and later re-started with at least one temperature within a predetermined range of an ambient temperature at the time of the re-start. The adjustment triggering module generates a triggering signal when a vehicle location provided by a global positioning system (GPS) is less than a predetermined distance from the identified location. The adjustment module selectively one of increases and decreases a rate at which a dosing agent is injected into an exhaust system, upstream of a selective catalytic reduction (SCR) catalyst, when the triggering signal is generated.

A control method for a vehicle includes: identifying a location where an engine of the vehicle is expected to be shut down and later re-started with at least one temperature within a predetermined range of an ambient temperature at the time of the re-start; generating a triggering signal when a vehicle location provided by a global positioning system (GPS) is less than a predetermined distance from the identified location; and selectively one of increasing and decreasing a rate at which a dosing agent is injected into an exhaust system, upstream of a selective catalytic reduction (SCR) catalyst, when the triggering signal is generated.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A dosing control module controls injection of a dosing agent (e.g., urea) into an exhaust system upstream of a selective catalytic reduction (SCR) catalyst. The SCR catalyst receives exhaust output by an engine of a vehicle. The exhaust includes nitrogen oxides (NOx). Ammonia ($NH_3$) provided to the SCR catalyst by the dosing agent reacts with NOx, thereby reducing the amount of NOx that is output from the SCR catalyst.

The dosing control module estimates an amount of ammonia stored by the SCR catalyst (current storage) and controls dosing agent injection based on the current storage. At some times (e.g., during or leading up to particulate filter regeneration), the current storage may approach or reach zero. If the vehicle is shutdown when the current storage is at or near zero, the current storage will be at or near zero when the engine is started the next time.

The current storage being at or near zero may be undesirable under some circumstances, such as when the engine is approximately at ambient conditions when the engine is started the next time. The current storage being at or near zero may be undesirable, for example, because a lesser amount of NOx will be removed due to the limited amount of ammonia present when and after the engine is started the next time. Additionally or alternatively, the dosing control module may refrain from injecting dosing agent until sufficient exhaust gas and catalyst temperatures are achieved.

A control module of the present disclosure identifies locations where the vehicle is shut down for long enough that the engine reaches approximately ambient conditions when the vehicle is started the next time. The control module selectively adjusts the rate at which dosing agent is injected when the vehicle comes within a predetermined distance of one of the identified locations. The selective adjustment is made in an effort to achieve a predetermined level of current storage if the vehicle is shut down at or near the identified location. The current storage being approximately equal to the predetermined level if the engine is next started at approximately ambient conditions tends to enable a greater amount of NOx to be removed when and after engine startup.

Figure 1:
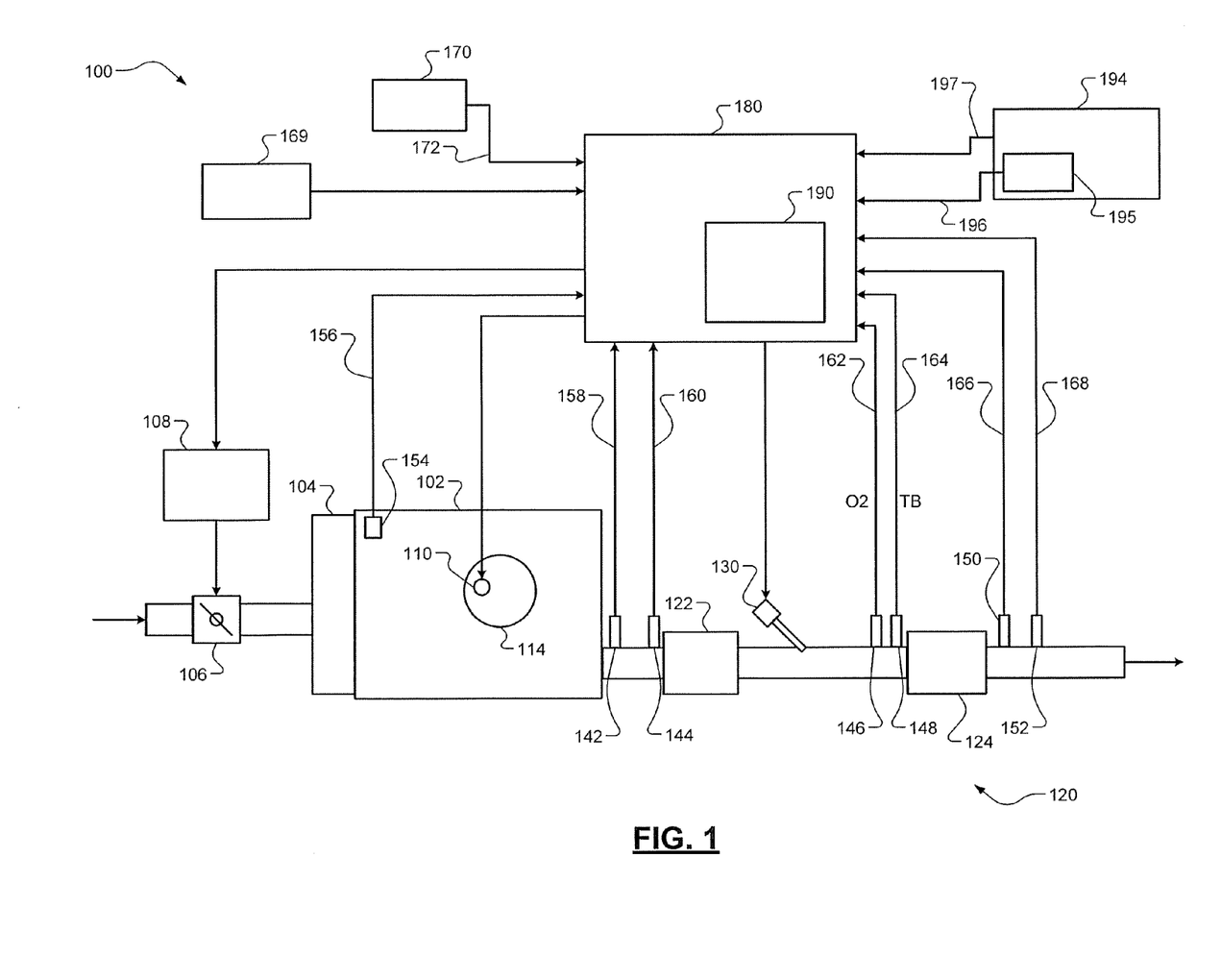
FIG. 1 is a functional block diagram of an example engine system according to the present disclosure.

Referring now to FIG. 1, a functional block diagram of an exemplary engine system 100 is presented. An engine 102 generates drive torque for a vehicle. While the engine 102 is shown and will be discussed as a diesel type engine, the engine 102 may be another suitable type of engine, such as a gasoline type engine or another suitable type of engine. One or more electric motors (or motor-generators) may additionally generate drive torque.

Air is drawn into the engine 102 through an intake manifold 104. Airflow into the engine 102 may be varied using a throttle valve 106. A throttle actuator module 108 controls opening of the throttle valve 106. One or more fuel injectors, such as fuel injector 110, mix fuel with the air to form an air/fuel mixture. The air/fuel mixture is combusted within cylinders of the engine 102, such as cylinder 114. Although the engine 102 is depicted as including one cylinder, the engine 102 may include more than one cylinder. While not shown, the engine system 100 may include one or more boost devices, such as one or more turbochargers and/or superchargers.

Exhaust is expelled from the engine 102 to an exhaust system 120. The exhaust may include particulate matter (PM) and exhaust gas. The exhaust (gas) includes nitrogen oxides (NOx), such as nitrogen oxide (NO) and nitrogen dioxide ($NO_2$). The exhaust system 120 includes a treatment system that reduces the respective amounts of NOx and PM in the exhaust.

The exhaust system 120 includes an oxidation catalyst (OC) 122 and a selective catalytic reduction (SCR) catalyst 124. The exhaust system 120 may also include a particulate filter (not shown). The exhaust flows from the engine 102 to the OC 122. For example only, the OC 122 may include a diesel oxidation catalyst (DOC). The exhaust flows from the OC 122 to the SCR catalyst 124. The exhaust may flow from the SCR catalyst 124 to the particulate filter. In various implementations, the particulate filter may be implemented in a common housing with the SCR catalyst 124. For example only, the particulate filter may include a diesel particulate filter (DPF).

A dosing agent injector 130 injects a dosing agent into the exhaust system 120 upstream of the SCR catalyst 124. For example only, the dosing agent injector 130 may inject the dosing agent at a location between the OC 122 and the SCR catalyst 124. The dosing agent includes urea ($CO(NH_2)_2$), ammonia ($NH_3$), and/or another suitable type of dosing agent that provides ammonia to the SCR catalyst 124. The dosing agent may also be referred to as an emissions fluid (EF), a diesel emissions fluid (DEF), or a reductant.

In implementations where the dosing agent includes urea, the urea reacts with the exhaust to produce ammonia, and ammonia is supplied to the SCR catalyst 124. The dosing agent may be diluted with water ($H_2O$) in various implementations. In implementations where the dosing agent is diluted with water, heat (e.g., from the exhaust) evaporates the water, and ammonia is supplied to the SCR catalyst 124. An example chemical equation that is illustrative of the production of ammonia from an example dosing agent solution is provided below.

$$HCNO + H_2O \rightarrow NH_3 + CO_2$$

The SCR catalyst 124 stores (i.e., absorbs) ammonia supplied by the dosing agent. For example only, the SCR catalyst 124 may include a vanadium catalyst, a zeolite catalyst, and/or another suitable type of SCR catalyst. An example chemical equation that is illustrative of ammonia absorption is provided below.

$$NH_3 + S \rightarrow NH_3(S)$$

The SCR catalyst 124 catalyzes a reaction between stored ammonia and NOx passing the SCR catalyst 124. The amount of ammonia stored by the SCR catalyst 124 is referred to as current storage. The current storage may be expressed as a mass of ammonia (e.g., grams), a number of moles of ammonia, or another suitable measure of an amount of ammonia stored by the SCR catalyst 124.

NOx and ammonia react at a known rate, which may be referred to as a reaction rate. The reaction rate may be described by the equation:

$$RR = \frac{X \text{ Moles NH}_3}{1 \text{Mole NO}x},$$

where RR is the reaction rate and X varies depending on the amount of nitrogen dioxide ($NO_2$) in the exhaust. For example only, X may vary between from 1.0 and 1.333.

A percentage of NOx input to the SCR catalyst 124 that is removed from the exhaust via reaction with ammonia may be referred to as NOx conversion efficiency. The NOx conversion efficiency is directly related to the current storage of the SCR catalyst 124. For example only, the NOx conversion efficiency increases as the current storage of the SCR catalyst 124 increases.

The current storage of the SCR catalyst 124, however, is limited to a maximum amount of ammonia. This maximum amount of ammonia is referred to as the maximum storage capacity of the SCR catalyst 124. Maintaining the current storage of the SCR catalyst 124 at the maximum storage capacity ensures that a maximum amount of NOx is removed from the exhaust. In other words, maintaining the current storage at the maximum storage capacity may ensure that a greatest possible NOx conversion efficiency is achieved.

However, maintaining the current storage at or near the maximum storage capacity also increases the possibility that ammonia will be exhausted from the exhaust system 120. Exhausting ammonia from the exhaust system 120 may be referred to as ammonia slip. The increased possibility of ammonia slip may be attributable to the inverse relationship between the maximum storage capacity and the temperature of the SCR catalyst 124. More specifically, the maximum storage capacity decreases as the SCR temperature increases, and the decrease in the maximum storage capacity may cause ammonia to desorb (i.e., release) from the SCR catalyst 124. In other words, an increase in the SCR temperature causes a decrease in maximum storage capacity, and ammonia stored in excess of this decreased maximum storage capacity may desorb from the SCR catalyst 124. Thus, an increase in the SCR temperature may cause ammonia slip. An example chemical equation that is illustrative of ammonia desorption is provided below.

$$NH_3(S) \rightarrow NH_3 + S$$

All or a portion of the ammonia supplied by the dosing agent may oxidize before or after being absorbed by the SCR catalyst 124. For example, ammonia may react with oxygen in the exhaust to produce nitrogen ($N_2$) and water ($H_2O$). Ammonia oxidation may be triggered by, for example, heat. An example chemical equation that is illustrative of ammonia oxidation is provided below.

$$4NH_3 + 3O_2 \rightarrow 2N_2 + 6H_2O$$

The reaction of ammonia with NOx produces nitrogen and water. Other components of the exhaust, such as oxygen ($O_2$), may also be involved in the ammonia and NOx reaction. The example chemical equations provided below are illustrative of the reaction of ammonia and NOx.

$$4NH_3 + 4NO + O_2 \rightarrow 4N_2 + 6H_2O$$

$$4NH_3 + 2NO + 2NO_2 \rightarrow 4N_2 + 6H_2O$$

$$8NH_3 + 6NO_2 \rightarrow 7N_2 + 12H_2O$$

An upstream NOx sensor 142 measures NOx in the exhaust at a location upstream of the OC 122. For example only, the upstream NOx sensor 142 may measure a mass flowrate of NOx (e.g., grams per second), a concentration of NOx (e.g., parts per million), or another suitable measure of the amount of NOx. The upstream NOx sensor 142 generates an input NOx (NOxIN) signal 158 based on the NOx in the exhaust upstream of the OC 122. A first temperature sensor 144 measures temperature of the exhaust upstream of the OC 122. The first temperature sensor 144 generates a first temperature (TA) signal 160 based on the temperature of the exhaust upstream of the OC 122.

An oxygen sensor 146 measures oxygen ($O_2$) in the exhaust at a location between the OC 122 and the SCR catalyst 124. The oxygen sensor 146 generates an oxygen ($O_2$) signal 162 based on the oxygen in the exhaust between the OC 122 and the SCR catalyst 124. A second temperature sensor 148 measures temperature of the exhaust at a location between the OC 122 and the SCR catalyst 124. The second temperature sensor 148 generates a second temperature (TB) signal 164 based on the temperature of the exhaust between the OC 122 and the SCR catalyst 124. For example only, the oxygen sensor 146 and the second temperature sensor 148 may be located between where the dosing agent injector 130 injects the dosing agent and the SCR catalyst 124.

A downstream NOx sensor 150 measures NOx in the exhaust at a location downstream of the SCR catalyst 124. For example only, the downstream NOx sensor 150 may measure a mass flowrate of NOx (e.g., grams per second), a concentration of NOx (e.g., parts per million), or another suitable measure of the amount of NOx. The downstream NOx sensor 150 generates an output NOx (NOxOUT) signal 166 based on the NOx in the exhaust downstream of the SCR catalyst 124. The downstream NOx sensor 150 is also cross-sensitive to ammonia and, therefore, the output NOx signal may also reflect ammonia in the exhaust downstream of the SCR catalyst 124.

A third temperature sensor 152 measures temperature of the exhaust downstream of the SCR catalyst 124. The third temperature sensor 152 generates a third temperature (TC) signal 168 based on the temperature of the exhaust downstream of the SCR catalyst 124. A coolant temperature sensor 154 measures temperature of engine coolant and generates an engine coolant temperature (ECT) signal 156 based on the coolant temperature. While the coolant temperature sensor 154 is shown as being implemented within the engine 102, the coolant temperature sensor 154 may be located in another suitable location where engine coolant is circulated.

One or more other sensors 169 may be implemented in the engine system 100. For example only, the other sensors 169 may include a mass air flowrate (MAF) sensor, an exhaust flow rate (EFR) sensor, an intake air temperature (IAT) sensor, a manifold absolute pressure (MAP) sensor, an engine speed (RPM) sensor, an exhaust pressure sensor, a cylinder pressure sensor, another oxygen sensor, and/or other suitable sensors.

A user initiates vehicle startup and shutdown events via an ignition system 170. For example only, the ignition system 170 may include one or more buttons, switches, and/or other devices that a user may actuate to command that the vehicle be turned ON and OFF. The ignition system 170 generates a vehicle ON/OFF signal 172 based on user inputs to the ignition system 170.

An engine control module (ECM) 180 controls the torque output of the engine 102. The ECM 180 may also control the engine 102 based on the vehicle ON/OFF signal 172. For example, the ECM 180 may initiate engine cranking to start the engine 102 when the vehicle ON signal 172 is received. The ECM 180 may disable the engine 102 when the vehicle OFF signal 172 is received.

The ECM 180 may include a dosing control module 190 that controls the injection of the dosing agent into the exhaust system 120. For example only, the dosing control module 190 may control the timing and rate of dosing agent injection. The dosing control module 190 controls the supply of ammonia to the SCR catalyst 124 and the current storage of the SCR catalyst 124 via controlling the injection of dosing agent.

The rate at which dosing agent is injected may be referred to as a dosing rate (e.g., grams per second), and the rate at which ammonia is supplied to the SCR catalyst 124 may be referred to as a supply rate (e.g., grams per second). The dosing control module 190 may determine a target supply rate, determine a target dosing rate to achieve the target supply rate, and control the injection of dosing agent at the target dosing rate.

A navigation system 194 may include a global positioning system (GPS) 195 that determines a vehicle location 196. The GPS 195 determines the vehicle location 196 based on signals from a plurality of satellites (not shown). The navigation system 194 may use the vehicle location 196 for one or more reasons, such as to display orientation of the vehicle, to determine a route between the vehicle location 196 and a selected location, and/or one or more other suitable reasons.

A user may make inputs to the navigation system 194, such as to a touch screen display (not shown) of the navigation system 194. For example only, the user may input a home location, a work location, etc. The navigation system 194 may generate user inputs 197 based on user inputs to the navigation system 194.

The dosing control module 190 of the present disclosure selectively adjusts dosing agent injection based on the vehicle location 196 to provide a predetermined current storage when a cold start event is initiated. A cold start event refers to when engine startup is initiated at a time when the engine 102 has approximately reached ambient conditions. The dosing control module 190 identifies locations where cold start events will likely be initiated and begins adjusting dosing agent injection when the vehicle location 196 is within a predetermined distance of an identified location.

If the vehicle is shutdown at or near an identified location, the current storage of the SCR catalyst 124 should be approximately equal to the predetermined current storage. The current storage being approximately equal to the current storage when a cold start event is initiated may tend to produce desirable exhaust characteristics, such as lesser NOx output from the SCR catalyst 124. While the dosing control module 190 is shown and discussed as being implemented within the ECM 180, the dosing control module 190 may be implemented within another module or independently.

Figure 2:
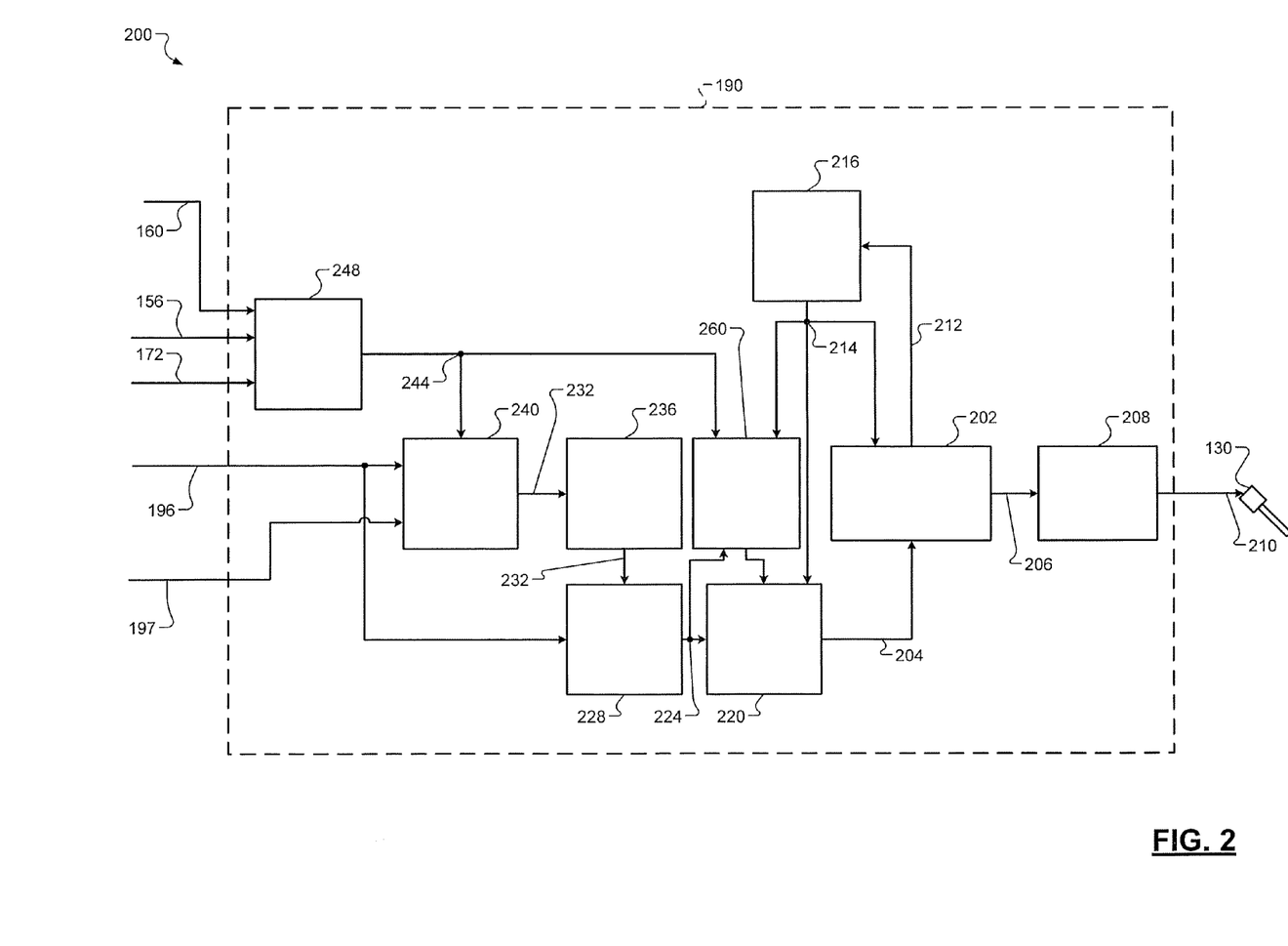
FIG. 2 is a functional block diagram of an example selective catalytic reduction (SCR) catalyst control system according to the present disclosure.

Referring now to FIG. 2, a functional block diagram of an exemplary dosing control system 200 is presented. A dosing management module 202 determines a base dosing rate (not shown). The dosing management module 202 selectively adjusts (increases or decreases) the base dosing rate based on one or more adjustments, such as adjustment 204, to generate a target dosing rate 206. For example only, the dosing management module 202 may set the target dosing rate 206 equal to the product of the base dosing rate by the adjustment 204 or to the sum of the adjustment 204 and the base dosing rate. The dosing management module 202 provides the target dosing rate 206 to an injector control module 208.

The injector control module 208 generates a signal 210 based on the target dosing rate 206 and applies the signal 210 to the dosing agent injector 130. The signal 210 applied to the dosing agent injector 130 may be, for example, a pulse width modulation (PWM) signal or another suitable type of signal. The injector control module 208 may set the duty cycle (i.e., percentage of time ON during a predetermined period of time) of the signal 210 to achieve the target dosing rate 206 and apply the PWM signal to the dosing agent injector 130. The injector control module 208 may determine the duty cycle for the signal 210, for example, using one or more functions or mappings that relate the target dosing rate 206 to the duty cycle of the signal 210. The dosing agent injector 130 injects the dosing agent based on the signal 210.

The base dosing rate corresponds to an injection rate of the dosing agent to achieve a supply rate of ammonia 212 to the SCR catalyst 124. The supply rate 212 corresponds to a desired rate to supply ammonia to the SCR catalyst 124. In implementations where ammonia is injected as the dosing agent, the base dosing rate may be equal to or approximately equal to the supply rate 212. The dosing management module 202 may determine the supply rate 212 based on an amount of ammonia currently stored 214 by the SCR catalyst 124 (i.e., the current storage) and/or one or more other suitable parameters, such as the amount of NOx input to the SCR catalyst 124, a target NOx conversion efficiency, temperature of the SCR catalyst 124, and/or one or more other suitable parameters. The dosing management module 202 may determine the supply rate 212, for example, to maximize the NOx conversion efficiency, to minimize the output NOx 166, to minimize ammonia slip, and/or to achieve one or more other suitable goals. In various implementations, the dosing management module 202 may adjust the supply rate 212 based on the adjustment 204 and determine the target dosing rate based on the (adjusted) supply rate 212.

A current storage module 216 estimates the current storage 214 of the SCR catalyst 124. For example only, the current storage module 216 may estimate the current storage 214 of the SCR catalyst 124 based on the supply rate 212, the input NOx 158, the output NOx 166, and/or one or more other suitable parameters. More specifically, the current storage module 216 may estimate the current storage 214 of the SCR catalyst 124 based on the supply rate 212, the NOx conversion efficiency, and/or one or more other suitable parameters.

A shutdown adjustment module 220 generates the adjustment 204. The shutdown adjustment module 220 may generate the adjustment 204 based on, for example, the current storage 214 of the SCR catalyst 124 and a predetermined cold start current storage. For example only, the shutdown adjustment module 220 may set the adjustment 204 to a non-adjusting value when an adjustment triggering signal 224 is in an inactive state (e.g., non-zero). The non-adjusting value may be, for example, 1.0 in implementations where the dosing management module 202 multiplies the base dosing rate by the adjustment 204 to generate the target dosing rate 206, 0.0 in implementations where the dosing management module 202 adds the adjustment 204 to the base dosing rate to generate the target dosing rate 206, or another suitable value.

When the adjustment triggering signal 224 is in an active state (e.g., zero), the shutdown adjustment module 220 may generate the adjustment 204 based on the current storage 214 of the SCR catalyst 124, the predetermined cold start current storage, and/or one or more other suitable parameters. The predetermined cold start current storage refers to a predetermined (desired) level of the current storage 214 when a cold start event is initiated. The predetermined cold start current storage is greater than zero.

For example only, the shutdown adjustment module 220 may generate the adjustment 204 based on a difference between the current storage 214 and the predetermined cold start current storage. The shutdown adjustment module 220 may generate the adjustment 204 using one or more functions and/or mappings that relate the difference to the adjustment 204. As a magnitude of the difference increases, the shutdown adjustment module 220 may adjust the adjustment 204 such that the current storage 214 is adjusted toward the predetermined cold start current storage at a faster rate. The shutdown adjustment module 220 may additionally or alternatively adjust the adjustment 204 such that the current storage 214 is adjusted toward the predetermined cold start current storage at a faster rate as time passes after the adjustment triggering signal 224 is transitioned from the inactive state to the active state and/or as the vehicle location 196 becomes closer to a cold start location.

An adjustment triggering module 228 generates the adjustment triggering signal 224 based on the vehicle location 196 and identified cold start locations 232. The cold start locations 232 that have been identified are stored in a cold start location storage module 236. A cold start location 232 is a location at or within a predetermined distance of which where the vehicle is expected to be shut down for long enough that a next vehicle startup will be a cold start event, such as a home, work, etc. In other words, a cold start location 232 is a location at or within a predetermined distance of which where a cold start event will likely occur if the vehicle is shut down.

The adjustment triggering module 228 may transition the adjustment triggering signal 224 from the inactive state to the active state, for example, when the vehicle location 196 is less than a predetermined distance from a cold start location 232. The predetermined distance may be a straight line distance, a driving distance, or another suitable type of distance. For example only, the predetermined distance may be a driving distance of approximately 2 miles.

A cold start location identification module 240 identifies and stores the cold start locations 232 in the cold start location storage module 236. The cold start location identification module 240 receives a cold start signal 244. A cold start detection module 248 generates the cold start signal 244 based on whether a vehicle startup event is a cold start event.

The cold start detection module 248 may set the cold start signal 244 to an active state (e.g., zero) for a predetermined period when a cold start event is initiated. The cold start detection module 248 may otherwise set the cold start signal 244 to an inactive state (e.g., non-zero). For example only, the cold start detection module 248 may set the cold start signal 244 to the active state when the ECT 156 and the exhaust temperature 160 are approximately equal to an ambient air temperature when a user inputs the vehicle ON signal 172. The ambient air temperature may be obtained via an ambient air temperature sensor (not shown), via the GPS 195, or in another suitable manner.

When the cold start signal 244 transitions from the inactive state to the active state, the cold start location identification module 240 checks the vehicle location 196. The cold start location identification module 240 may identify the vehicle location 196 and store the vehicle location 196 as a cold start location 232 when at least a predetermined number of cold start events have previously occurred at or within a predetermined distance of the vehicle location 196 over a predetermined period. The predetermined number of cold start events is a predetermined integer that may be greater than or equal to 1. The predetermined period may be, for example, a predetermined number of days, weeks, months, years, or cold start events.

The cold start location identification module 240 may selectively identify the user input location 197 and store the user input location 197 as a cold start location 232. For example only, the cold start location identification module 240 may selectively identify a user input location 197 that is input by a user as a home location and/or a work location as a cold start location 232.

A learning module 260 receives the cold start signal 244 and the adjustment triggering signal 224. The learning module 260 obtains the current storage 214 of the SCR catalyst 124 when the vehicle is shut down and the adjustment triggering signal is in the active state. In other words, the learning module 260 obtains the current storage 214 at vehicle shutdown when the current storage 214 should be approximately equal to the predetermined cold start current storage due the use of the adjustment 204.

When the next vehicle startup is a cold start event, as indicated by the cold start signal 244, the learning module 260 compares the current storage 214 at the last vehicle shutdown to the predetermined cold start current storage. The learning module 260 may selectively adjust the shutdown adjustment module 220 based on a difference between the current storage 214 at the last vehicle shutdown and the predetermined cold start current storage. For example only, the learning module 260 may adjust the one or more functions and/or mappings that the shutdown adjustment module 220 may use to generate the adjustment 204 in the future. Adjusting the one or more functions and/or mappings may enable the dosing management module 202 to more closely adjust the current storage 214 to the predetermined cold start current storage in the future.

Figure 3:
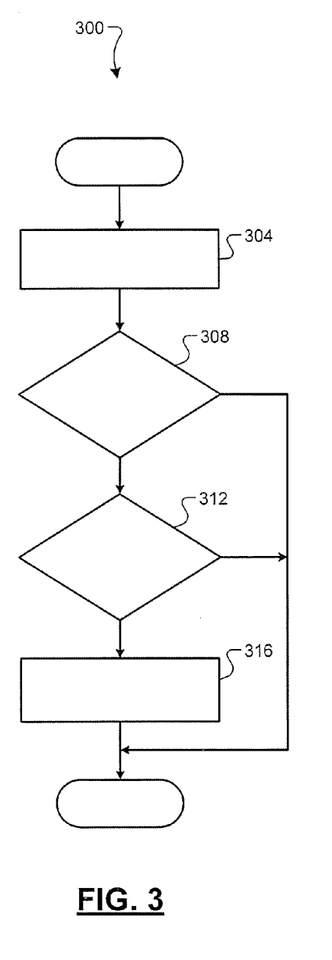
FIG. 3 is a flowchart depicting an example method of identifying cold start locations according to the present disclosure.

Referring now to FIG. 3, a flowchart depicting an exemplary method 300 of identifying a cold start location 232 is presented. Control begins when the vehicle ON signal 172 is received at 304 where control begins cranking the engine 102 and control establishes the vehicle location 196. At 308, control determines whether the vehicle startup event is a cold start event. If true, control continues with 312; if false, control may end. For example only, control may determine that the vehicle startup event is a cold start event when the exhaust temperature 160 and the ECT 156 are approximately equal to (e.g., within a predetermined range of) the ambient air temperature when or shortly after the vehicle ON signal 172 is received.

At 312, control may determine whether to identify the vehicle location 196 as a cold start location 232. If true, control stores the vehicle location 196 as a cold start location 232 at 316 and control may end; if false, control may end. Control may identify the vehicle location 196 as a cold start location 232, for example, when at least the predetermined number of cold start events has previously been initiated at or within a predetermined distance of the vehicle location 196 over the past predetermined period.

Figure 4:
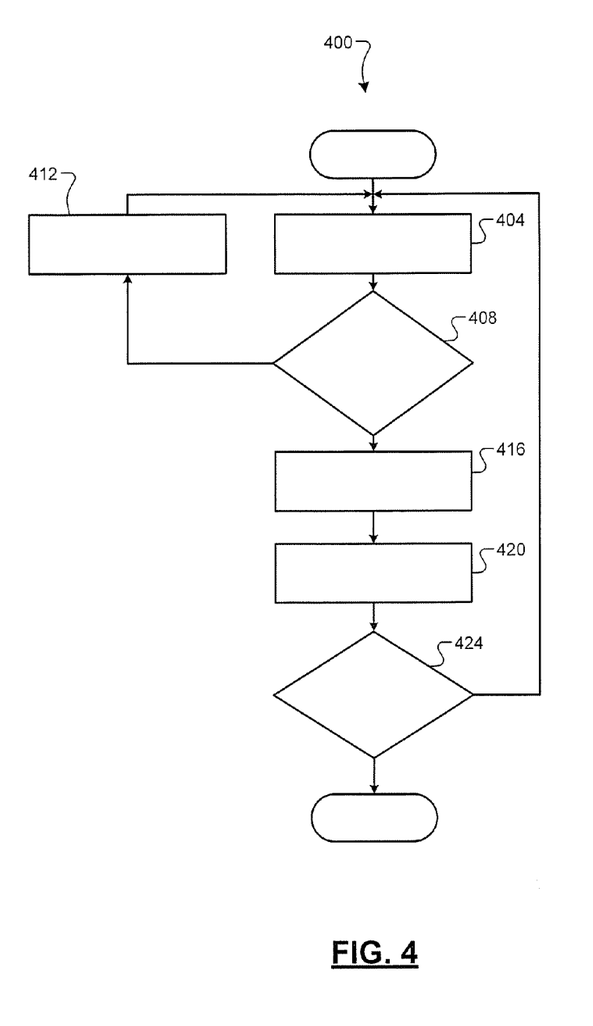
FIG. 4 is a flowchart depicting an example method of selectively adjusting dosing agent injection based on proximity to a cold start location according to the present disclosure.

Referring now to FIG. 4, a flowchart depicting an example method 400 of adjusting the rate at which the dosing agent is injected based on the vehicle location 196 is presented. Control begins at 404 where control monitors the vehicle location 196. Control may determine whether the vehicle location 196 is within the predetermined distance of a cold start location 232 at 408. If false, control may set the adjustment 204 to the non-adjusting value at 412 and return to 404. If true, control may generate the adjustment 204. For example only, the predetermined distance may be approximately 2 miles.

Control may generate the adjustment 204 at 416. For example, control may generate the adjustment 204 at 416 using one or more functions and/or mappings that relate the difference between the current storage 214 and the predetermined cold start adjustment to the adjustment 204. Control adjusts the target dosing rate 206 based on the adjustment 204 at 420. Control determines whether the vehicle OFF signal 172 has been received at 424. If true, control ends; if false, control may return to 404.

Figure 5:
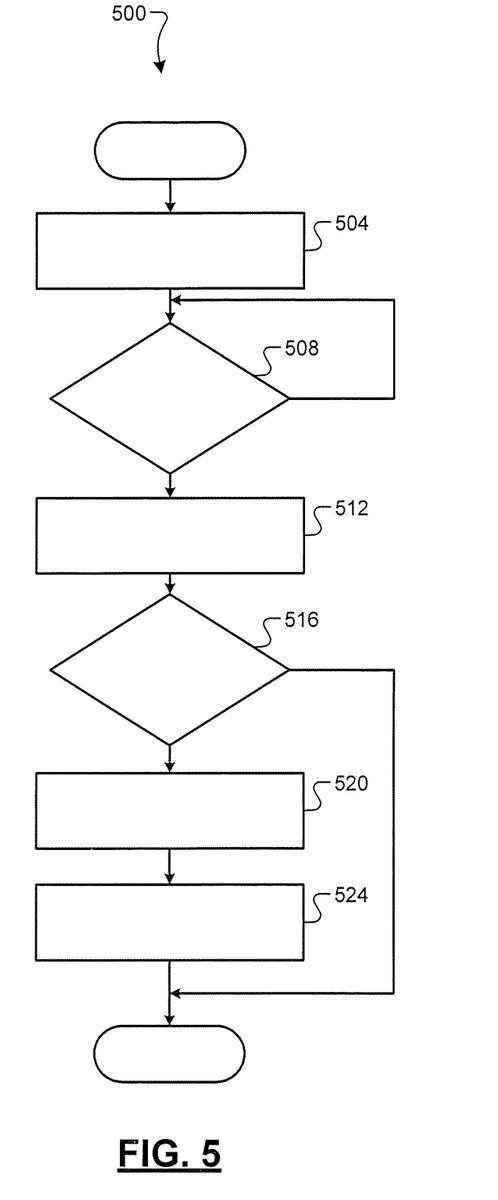
FIG. 5 is a flowchart depicting an example method of adjusting dosing rate adjustments according to the present disclosure.

Referring now to FIG. 5, a flowchart depicting an example method 500 of adjusting the adjustment 204 for a future cold start event is presented. Control may begin at 504 where control shuts down the engine 102 and checks the current storage 214 of the SCR catalyst 124 when the vehicle OFF signal 172 is received. Control determines whether the vehicle ON signal 172 is received at 508. If true, control continues to 512; if false, control may remain at 508.

At 512, control initiates engine cranking to start the engine 102. For example only, control may engage and activate a starter (not shown). Control determines whether the vehicle startup event is a cold start event at 516. If true, control continues to 520; if false, control may end. Control may determine that the vehicle startup event is a cold start event, for example, when the exhaust temperature 160 and the ECT 156 are approximately equal to the ambient air temperature.

Control compares the current storage 214 (from 504) to the predetermined cold start current storage at 520. Control selectively adjusts the adjustment 204 that may be generated in the future based on the comparison between the current storage 214 and the predetermined cold start current storage at 524. For example only, control may selectively adjust the one or more functions and/or mappings used in generating the adjustment 204 at 524. The selective adjustment may help achieve the predetermined cold start current storage when the vehicle is shutdown in the future at one of the cold start locations 232. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle, comprising:
a location identification module that identifies a location where an engine of the vehicle is expected to be shut down and later re-started with an engine coolant temperature within a predetermined range of an ambient temperature at the time of the re-start;
an adjustment triggering module that generates a triggering signal when a vehicle location provided by a global positioning system (GPS) is less than a predetermined distance from the identified location; and
an adjustment module that selectively one of increases and decreases a rate at which a dosing agent is injected into an exhaust system, upstream of a selective catalytic reduction (SCR) catalyst, when the triggering signal is generated.

2. The control system of claim 1 wherein the adjustment module selectively one of increases and decreases the rate based on an amount of ammonia currently stored by the SCR catalyst and a predetermined amount, and
wherein the predetermined amount is greater than zero.

3. The control system of claim 2 wherein the adjustment module selectively one of increases and decreases the rate based on a difference between the amount and the predetermined amount.

4. The control system of claim 2 wherein the adjustment module selectively one of increases and decreases the rate further based on a distance between the vehicle location provided by the GPS and the identified location.

5. The control system of claim 2 wherein the adjustment module selectively one of increases and decreases the rate further based on a period elapsed since the triggering signal was generated.

6. The control system of claim 2 wherein the adjustment module generates an adjustment using one of a function and a mapping that relates a difference between the amount and the predetermined amount to the adjustment,
wherein the adjustment module one of increases and decreases the rate based on the adjustment.

7. The control system of claim 6 further comprising a learning module that selectively adjusts the one of the function and the mapping based on a comparison of the amount and the predetermined amount.

8. The control system of claim 7 wherein the learning module disables the selective adjustment of the one of the function and the mapping when the an engine coolant temperature is outside of the predetermined range of the ambient temperature at a vehicle startup event.

9. The control system of claim 7 further comprising a dosing management module that sets the rate equal to one of a product of a base rate and the adjustment and a sum of the base rate and the adjustment.

10. A control method for a vehicle, comprising:
identifying a location where an engine of the vehicle is expected to be shut down and later re-started with an engine coolant temperature within a predetermined range of an ambient temperature at the time of the re-start;
generating a triggering signal when a vehicle location provided by a global positioning system (GPS) is less than a predetermined distance from the identified location; and
selectively one of increasing and decreasing a rate at which a dosing agent is injected into an exhaust system, upstream of a selective catalytic reduction (SCR) catalyst, when the triggering signal is generated.

11. The control method of claim 10 further comprising selectively one of increasing and decreasing the rate based on an amount of ammonia currently stored by the SCR catalyst and a predetermined amount,
wherein the predetermined amount is greater than zero.

12. The control method of claim 11 further comprising selectively one of increasing and decreasing the rate based on a difference between the amount and the predetermined amount.

13. The control method of claim 11 further comprising selectively one of increasing and decreasing the rate further based on a distance between the vehicle location provided by the GPS and the identified location.

14. The control method of claim 11 further comprising selectively one of increasing and decreasing the rate further based on a period elapsed since the triggering signal was generated.

15. The control method of claim 11 further comprising:
generating an adjustment using one of a function and a mapping that relates a difference between the amount and the predetermined amount to the adjustment; and
one of increasing and decreasing the rate based on the adjustment.

16. The control method of claim 15 further comprising selectively adjusting the one of the function and the mapping based on a comparison of the amount and the predetermined amount.

17. The control method of claim 16 further comprising disabling the selective adjustment of the one of the function and the mapping when the an engine coolant temperature is outside of the predetermined range of the ambient temperature at a vehicle startup event.

18. The control method of claim 16 further comprising setting the rate equal to one of a product of a base rate and the adjustment and a sum of the base rate and the adjustment.

19. A control method for a vehicle, comprising:
- identifying a location where an engine of the vehicle is expected to be shut down and later re-started with at least one temperature within a predetermined range of an ambient temperature at the time of the re-start;
- generating a triggering signal when a vehicle location provided by a global positioning system (GPS) is less than a predetermined distance from the identified location;
- generating an adjustment using one of a function and a mapping that relates a difference between an amount of ammonia currently stored by a selective catalytic reduction (SCR) catalyst and a predetermined amount to the adjustment, wherein the predetermined amount is greater than zero;
- based on the adjustment, selectively one of increasing and decreasing a rate at which a dosing agent is injected into an exhaust system, upstream of the SCR catalyst, when the triggering signal is generated;
- selectively adjusting the one of the function and the mapping based on a comparison of the amount and the predetermined amount; and
- disabling the selective adjustment of the one of the function and the mapping when the at least one temperature is outside of the predetermined range of the ambient temperature at a vehicle startup event.

* * * * *